United States Patent Office 3,560,560

Patented Feb. 2, 1971

3,560,560
PURIFICATION OF ACETIC ACID

Ben Wilton Kiff, Ona, W. Va., assignor to Union Carbide Corporation

No Drawing. Filed May 8, 1968, Ser. No. 727,732
Int. Cl. C07c 53/08
U.S. Cl. 260—541 4 Claims

ABSTRACT OF THE DISCLOSURE

Small amounts of formic acid, which are not ordinarily removable by conventional refining procedures, are removed from glacial acetic acid by selective oxidation over a molybdenum-containing catalyst.

The liquid phase oxidation of low molecular weight aliphatic hydrocarbons to produce a complex mixture containing acids, aldehydes, ketones, etc. is a well known and important commercial process. The recovery of the individual components of this complex mixture by a complicated series of conventional distillations and refining procedures is also known.

One of the acids produced by this oxidation process is acetic acid which is recovered in a relatively pure state. However, the acetic acid still contains small amounts of impurities, one of which is formic acid. Commercial requirements are such that the formic acid content in the acetic acid should desirably be less than 0.15 weight percent and, consequently, many procedures have been used to decrease the formic acid contained in the acetic acid obtained. Thus, for example, the crude acetic acid has been treated with catalysts such as platinum, osmium, iridium, paladium, ruthenium and rhodium supported on activated carbon or aluminum oxide. Many other catalysts have also been used in an attempt to selectively oxidize the formic acid and reduce its concentration in the acetic acid. Such attempts can be found in U.S. 3,041,373, U.S. 2,913,492, Canada 652,216, U.S. 2,656,379, U.S. 3,196,-176, U.S. 2,688,635, U.S. 2,900,413, French 1,101,188, and Netherlands 6504362. However, such attempts have not been completely successful.

It has now been found that the trace amounts of formic acid present in glacial acetic acid can be essentially completely removed by passing acetic acid and air over a particular type of oxidation catalyst. The catalyst may be a definite chemical compound such as a metal molybdate, or a mechanical mixture of the oxides of the two metals, that is, the metal oxide and the molybdenum oxide. Among the suitable metal molybdates one can mention nickel molybdate, cobalt molybdate, copper molybdate, iron molybdate, vanadium molybdate, bismuth molybdate, manganese molybdate, chromium molybdate, zinc molybdate, tin molybdate, antimony molybdate, tungsten molybdate, and the like.

The metal oxides that can be used in admixture with the molybdenum oxide include, for example, nickel oxides, cobalt oxides, copper oxides, iron oxides, tin oxides, vanadium oxides, bismuth oxides, zinc oxides, chromium oxides, managnese oxides, tungsten oxides, and the like.

The catalyst may be used in a fixed bed reactor, for example, in tabletted or extruded form, or deposited on one of the known inert supports such as carborundum, alumina, chromia and the like. Alternatively, it may be used in a finely divided state in a fluidized bed reactor.

In the reaction, a mixture of the acetic acid containing the formic acid and air is passed over the catalyst. The formic acid is selectively oxidized upon contact with the catalyst and after the completion of the selective oxidation reaction the purified acetic acid is recovered by conventional distillation or extraction procedures known to those skilled in the art.

The temperature of the reaction can vary from about 200° C. to 450° C. or higher. Any temperature can be used at which the reaction can proceed and at which the acetic acid is not significantly decomposed. A preferred temperature range is from about 250° C. to 400° C., with a more preferred range being from 275° C. to about 350° C. The temperature is not a critical factor. The reaction can be carried out at sub-atmospheric, atmospheric or super-atmospheric pressure and it is not critical.

The amount of air used relative to the amount of acetic acid can range from 0.1 liter to about 5 liters or more for each 100 grams of acetic acid fed. Larger amounts of air can be used if desired but show no advantage. The preferred range is from about 0.5 liter to 3.0 liter of air per hundred grams of acetic acid fed to the reactor. The contact time of the acetic acid mixture with the catalyst can range from 0.5 second to 3 seconds or longer. Preferably the contact time is from 1 to 2 seconds. Under such conditions it has been found that the productivity of nickel molybdate is usually in the range of 120 to 200 lbs. per cubic foot of catalyst. The productivity is defined as the total pounds of acetic acid treated per hour divided by the cubic feet of catalyst used. If some decomposition of the acetic acid is not considered objectionable, contact times of several minutes can be employed. This, however, is not commercially desirable.

The decomposition of acetic acid is very slight when the reaction is conducted properly, as outlined above, with contact times of several seconds; recoveries of acetic acid of from 98 to 99 percent have been achieved.

In a typical reaction the acetic acid containing the small amount of formic acid is passed through a fixed bed reactor containing the metal molybdate catalyst at a temperature of from about 250° C. to 400° C. at such a rate that the contact time of the feed with the catalyst is from about 1 to 2 seconds. The material exiting from the reactor is recovered and the purified acetic acid obtained by simple distillation.

In the following example a vapor phase reactor was used. This was a Dowtherm-heated stainless tube which had a length of 48 inches and a diameter of one inch. The reactor contained 200 cc. of nickel molybdate as catalyst with a layer of inert packing in the top section of a tube. The acetic acid feed was introduced into the top of the reactor at a rate of 500 cc. per hour together with air at a rate of 10 liters per hour. The temperature of the reactor was maintained at 300° C. The acetic acid feed contained as impurities 0.26 percent formic acid, about 7 p.p.m. methyl isopropenyl ketone and about 8 p.p.m. methyl vinyl ketone. The rate of feed resulted in a contact time of 1.75 seconds. The productivity was 155 lbs. of treated acetic acid per cubic foot of catalyst per hour. The recovered acetic acid contained only 0.002 percent formic acid, indicating that more than 99 percent had been removed.

Similar results are obtained using a mixture of molybdenum oxide and nickel oxide as the catalyst.

What is claimed is:

1. A process for removing formic acid impurity from acetic acid which comprises contacting a mixture of said acids and oxygen at a temperature of from about 200° C. to 40° C. with a catalyst selected from the group consisting of (i) a metal molybdate wherein the metal is nickel, cobalt, copper, iron, vanadium, bismuth, manganese, chromium, zinc, tin, antimony or tungsten; and (ii) a mixture of molybdenum oxide and a metal oxide wherein the metal is nickel, cobalt, copper, iron, vanadium, bismuth, manganese, chromium, zinc, tin or tungsten; and recovering the purified acetic acid.

2. A process as claimed in claim 1 wherein a reaction temperature is from about 250° C. to 400° C.

3. A process as claimed in claim 1 wherein the catalyst is nickel molybdate.

4. A process as claimed in claim 1 wherein the catalyst is a metal molybdate as defined in claim 1.

References Cited

UNITED STATES PATENTS

| | | | |
|---|---|---|---|
| 2,273,459 | 2/1942 | Britton et al. | 260—541 |
| 2,255,421 | 9/1941 | Groll et al. | 260—541 |
| 2,913,492 | 11/1959 | Van der Voort | 260—541 |
| 3,384,659 | 5/1968 | Bate | 260—541 |

LORRAINE A. WEINBERGER, Primary Examiner

V. GARNER, Assistant Examiner